July 19, 1960   J. M. MORRIS   2,945,958
LIGHT COLLECTOR
Filed Oct. 25, 1956

INVENTOR
JEAN MORTON MORRIS
BY John Ellsworth Griffiths
ATTORNEY

United States Patent Office 2,945,958
Patented July 19, 1960

2,945,958
LIGHT COLLECTOR

Jean Morton Morris, Wilmington, Del., assignor to E. I. du Pont de Nemours and Company, Wilmington, Del., a corporation of Delaware Filed Oct. 25, 1956, Ser. No. 618,343

8 Claims. (Cl. 250—230)

This invention relates to a light collector and more particularly to a device for collecting light which is distributed along a line.

It is an object of this invention to provide an improved apparatus for collecting light. Another object is to provide such an apparatus which is capable of receiving a plane beam of light as well as a single unidirectional ray of light which may be repetitively scanning along a line, and transmitting the light to a detector. Yet another object is to provide such an apparatus which is highly efficient in the collection and transmission of light. A further object is to provide such an apparatus which is relatively inexpensive, easily constructed, not complex and has no moving parts. Still other objects will be apparent from the following description of the invention.

A light collecting apparatus will now be described with reference to the accompanying drawing, wherein.

Figure 1:
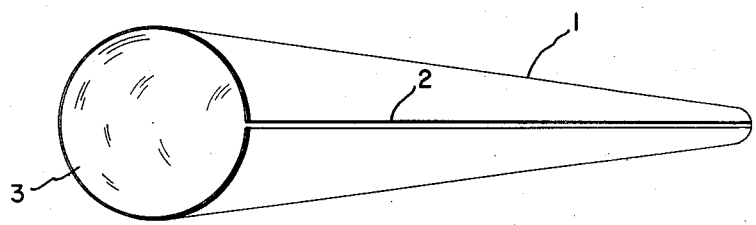
Fig. 1 is a perspective view of a preferred embodiment of the invention.
Figure 2:
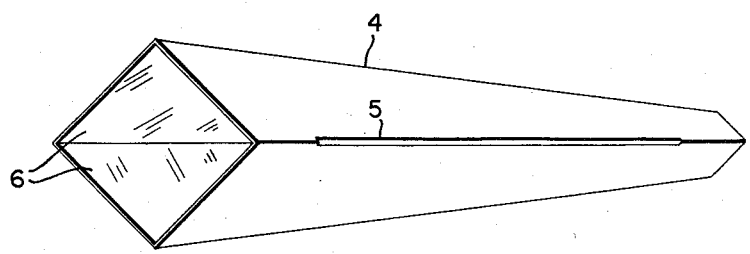
Fig. 2 is a perspective view of another embodiment of the invention.

As illustrated by Fig. 1, the light collector comprises a hollow frustum 1 of a cone having in its side a narrow slot 2 along a line passing through the apex of the cone. The interior surface 3 of the collector is highly reflective of light. In another embodiment, shown in Fig. 2, the collector is a hollow truncated pyramid 4 having a narrow slot 5 and highly reflective interior surface 6.

Figure 3:
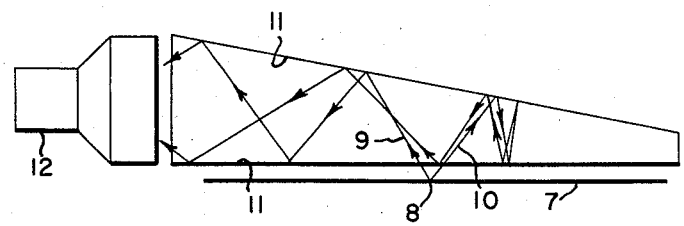
Fig. 3 is a schematic representation of a light collector according to this invention, illustrating the direction of travel of light being collected and transmitted to a detector.

The use of the collector is shown in Fig. 3, wherein plane light from a source along line 7 enters the collector through its narrow elongated aperture. For purposes of illustration, a single point source 8 on line 7 is shown sending light rays 9 and 10 into the collector, where the light is reflected and again reflected from the interior surface 11 until the light arrives at the detector 12 located at the base of the collector. Total illumination and variations in intensity of the light collected can thus be simply indicated by the detector 12 and interpreted in terms of whatever purpose the collected light 9 and 10 is serving.

It is essential that the novel collector of this invention be a tapered tubular structure. It can be either a cone or a pyramid, although preferably it is a cone or pyramid whose vertex is cut off by a plane. If it is a pyramid, it can have a base of any number of sides from three to infinity. If it is a truncated pyramid, the plane of the base and the plane of the opposite end of the tubular structure are preferably but not necessarily parallel. If it is a frustum of a cone, the plane of the base and the plane of the opposite end of the tubular structure are also preferably parallel but an ungula is satisfactory.

The slot in the collector is in the side approximately along the direction of taper and preferably along a line passing through the apex of the tubular structure. The slot is constructed only wide enough to collect the optimum amount of light and to minimize the loss of light reflected from the interior of the collector out the slot. The length of the slot is determined by the width of the plane of imposed light and may be very short, as when a small non-traveling single ray of light is utilized, or very long, as when a single ray of light is traveling back and forth along the line in a scanning operation or when a wide plane beam of non-traveling light is utilized.

The collector may have suitable handles or supporting elements attached thereto. It has a highly reflective interior surface and may be made of suitable materials which will readily occur to persons in the art, e.g., metals, alloys or plastics which are finished to a high degree of smoothness or materials which have been coated with highly reflective particles. Glass which has been made highly reflective by an aluminum or silver coating is the preferred material.

The size and degree of taper of the tapered tubular structure will depend on the conditions of use and will readily be determined by persons skilled in the art. Generally, the base of the conical or pyramidal structure will be small enough to be positioned completely within the detector's area of sensitivity and will be as large as possible (within the detector's area of sensitivity) in order to minimize the number of internal reflections of light. If the structure is truncated, it is preferable to cover the smaller end of the tapered tube, as by a cap, with material which likewise has a highly reflective interior surface, to minimize light loss and preclude the entrance of stray radiation. The length of the slot will be determined by the imposed light, and the length of the collector in turn will preferably be the same length as the slot or not much longer.

The apparatus of this invention is useful to collect light which is distributed, either uniformly or non-uniformly, along a line and to direct that light to a detector. In general, the length of the line along which the light is being distributed will exceed the detector's area of sensitivity or else the detector could be used directly without need for a collector. The detector can be an optical or electronic device, e.g., a photoelectric tube or photomultiplier, which may record, interpret, act upon and/or transmit the duration, intensity and/or color of the light which it detects. Specific applications of the usefulness of this apparatus as taught herein will readily be apparent.

One particular utility of the light collector of this invention is in combination with a surface irregularity measuring instrument. A plane beam of light is imposed over a moving object and into the slot of the collector of this invention, from which it energizes a photoelectric tube which in turn causes a meter to register as an indication of the total illumination in the plane beam of light. A protuberance or projection on the surface of the moving object will interrupt the beam of light, reducing the illumination which enters the collector and reaches the detector, thus effecting a variation in the meter reading.

Another useful application of the light collector is in yarn counting apparatus wherein a single traveling ray or "spot" of light scans across the path of a number of moving fibers or filaments. An automatic recorder connected to the detector will record the number of times the light ray is prevented from entering the collector or the amount of light entering the collector is reduced by an intervening fiber.

Although the tapered tubular light collector of this invention is preferably a hollow structure, the interior surface of which is highly reflective as hereinbefore described, it is possible for the collector to be of solid structure, such as of glass or of a light transmitting plastic, e.g., methyl methacrylate, which preferably has a surface coating of a reflective material, e.g., silver, except on an elongated area on a side of the structure to serve as the slot as hereinbefore described.

An advantage of the light collector of this invention is that it has superior light collecting power compared with conventional optical light collecting means. Another advantage is that the collector of this invention is capable of collecting light distributed along a line. Yet another advantage is that it efficiently collects light from a plane beam of light as well as a traveling or scanning unidirectional ray of light. Additional advantages are that it is relatively inexpensive, easily constructed, has no moving parts and readily combinable with measuring, detecting, recording, counting and similar apparatus such as inspection apparatus, e.g., of the types described in U.S. Patents Nos. 2,246,906, 2,393,631, 2,617,048 and 2,719,235. Still other advantages will be apparent from the above description of the invention.

The invention claimed is:

1. A light collecting apparatus comprising a hollow tapered tubular structure having an interior surface highly reflective of light, said structure being truncated and having one open end and at the opposite end from said open end a smaller closed end having an interior surface highly reflective of light, and having a slot in the side of said structure, said slot being located with its longer dimension in the direction of taper of said tapered structure.

2. Apparatus as set forth in claim 1 wherein said structure is a frustum of a cone.

3. Apparatus as set forth in claim 1 wherein said structure is a truncated pyramid.

4. Apparatus as set forth in claim 1 wherein said structure is glass highly reflective on its interior surface.

5. Apparatus which includes in combination light detector means and light collecting means, said light collecting means comprising a hollow tapered tubular structure having an interior surface highly reflective of light, said structure being truncated and having one open end and at the opposite end from said open end a smaller closed end having an interior surface highly reflective of light, and having a slot in the side of said structure said slot being located with its longer dimension in the direction of taper of said tapered structure, said light detector means being located outside of said tubular structure and positioned adjacent said open end of said structure, whereby light entering said structure through said slot is reflected by said highly reflective interior surfaces to impinge upon said light detector means.

6. Apparatus as set forth in claim 5 wherein said hollow tapered tubular structure is a frustum of a cone.

7. Apparatus as set forth in claim 5 wherein said hollow tapered tubular structure is a truncated pyramid.

8. Apparatus as set forth in claim 5 wherein said interior surface is a highly reflective glass.

References Cited in the file of this patent

UNITED STATES PATENTS

| | | |
|---|---|---|
| 291,146 | Calver | Jan. 1, 1884 |
| 1,297,658 | Cantrell et al. | Mar. 18, 1919 |
| 1,912,156 | Owens | May 30, 1933 |
| 2,246,501 | Bradner et al. | June 24, 1941 |
| 2,277,502 | Padva | Mar. 24, 1942 |
| 2,753,464 | Stone | July 3, 1956 |

FOREIGN PATENTS

| | | |
|---|---|---|
| 621,267 | Germany | Nov. 4, 1935 |
| 894,323 | Germany | Oct. 22, 1953 |